United States Patent
Medles et al.

(10) Patent No.: US 11,388,669 B2
(45) Date of Patent: Jul. 12, 2022

(54) METHOD AND APPARATUS FOR POWER CONSUMPTION REDUCTION WITH MULTI-LINK OPERATION IN MOBILE COMMUNICATIONS

(71) Applicant: MediaTek Singapore Pte. Ltd., Singapore (SG)

(72) Inventors: Abdelkader Medles, Cambridge (GB); Pradeep Jose, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 96 days.

(21) Appl. No.: 16/747,472

(22) Filed: Jan. 20, 2020

(65) Prior Publication Data

US 2020/0245249 A1 Jul. 30, 2020

Related U.S. Application Data

(60) Provisional application No. 62/797,967, filed on Jan. 29, 2019.

(51) Int. Cl.
*H04W 52/02* (2009.01)
*H04W 76/15* (2018.01)
*H04W 72/04* (2009.01)

(52) U.S. Cl.
CPC ..... *H04W 52/0235* (2013.01); *H04W 72/042* (2013.01); *H04W 76/15* (2018.02)

(58) Field of Classification Search
CPC ............ H04W 52/0235; H04W 76/15; H04W 72/042; H04W 52/0229; H04W 76/28; H04W 76/27; H04W 76/34; H04W 52/02; H04W 88/06; H04W 36/0069; H04W 52/0216; Y02D 30/70; H04L 5/0098
See application file for complete search history.

(56) References Cited

U.S. PATENT DOCUMENTS

2014/0010086 A1\* 1/2014 Etemad .................. H04L 45/70
370/235
2015/0189574 A1 7/2015 Ng et al.
(Continued)

FOREIGN PATENT DOCUMENTS

| CN | 104902549 A | 9/2015 |
|---|---|---|
| CN | 107251592 A | 10/2017 |

(Continued)

OTHER PUBLICATIONS

3GPP TSG-RAN WG2 Meeting #102, R2-1806774, Busan South Korea, May 21-25, 2018 (Year: 2018).\*

(Continued)

*Primary Examiner* — Michael K Phillips
(74) *Attorney, Agent, or Firm* — Han IP PLLC; Andy M. Han

(57) ABSTRACT

Various solutions for power consumption reduction with multi-link operation with respect to user equipment and network apparatus in mobile communications are described. An apparatus may establish a first link with a first network node. The apparatus may establish a second link with a second network node. The apparatus may receive a dormancy indication via a physical layer signaling from the first network node. The apparatus may transit a dormancy state of the second network node according to the dormancy indication.

18 Claims, 3 Drawing Sheets

(56) References Cited

U.S. PATENT DOCUMENTS

| | | | |
|---|---|---|---|
| 2015/0215929 A1* | 7/2015 | Damnjanovic | H04W 56/001 370/241 |
| 2015/0257198 A1* | 9/2015 | Su | H04W 76/28 455/552.1 |
| 2016/0345311 A1* | 11/2016 | Chen | H04W 72/0446 |
| 2017/0170942 A1* | 6/2017 | Qiu | H04W 16/32 |
| 2017/0325164 A1 | 11/2017 | Lee et al. | |
| 2017/0374703 A1* | 12/2017 | Sang | H04W 48/08 |
| 2018/0302848 A1* | 10/2018 | Liu | H04W 24/08 |
| 2019/0182675 A1* | 6/2019 | Pu | H04W 16/14 |
| 2019/0239189 A1* | 8/2019 | Hwang | H04W 52/0229 |
| 2019/0253230 A1* | 8/2019 | Loehr | H04W 72/0453 |
| 2019/0254110 A1* | 8/2019 | He | H04L 5/0048 |
| 2019/0357261 A1* | 11/2019 | Cirik | H04W 76/11 |
| 2020/0092814 A1* | 3/2020 | Zhou | H04W 80/02 |
| 2020/0236692 A1* | 7/2020 | Lin | H04L 5/0094 |
| 2020/0344695 A1* | 10/2020 | Wang | H04W 52/0274 |
| 2021/0051759 A1* | 2/2021 | Zhou | H04W 72/042 |
| 2021/0400763 A1* | 12/2021 | Zhou | H04W 72/042 |

FOREIGN PATENT DOCUMENTS

| | | | | |
|---|---|---|---|---|
| CN | 111147210 A | * | 5/2020 | ............ H04W 72/04 |
| WO | WO 2014121504 A1 | | 8/2014 | |
| WO | WO 2016063113 A1 | | 4/2016 | |

OTHER PUBLICATIONS

3GPP TSG-RAN WG2 Meeting #102 R2-1808570, Busan South Korea, May 21-25, 2018 (Year: 2018).*

3GPP TSG-RAN WG2 Meeting #102, R2-1806774, Busan, South Korea, May 21-25, 2018.

3GPP TSG-RAN WG2 Meeting #102, R2-1808570, Busan, South Korea, May 21-25, 2018.

China National Intellectual Property Administraion, International Search Report and Written Opinion tor PCT/CN2020/073703, dated Apr. 21, 2020.

Mediatek Inc., DRX Cycle adaptation for NR UE power saving, R1-1901110, 3GPP TSG RAN WG1 Meeting AH-1901, Taipei, Taiwan, Jan. 21-25, 2019.

* cited by examiner

METHOD AND APPARATUS FOR POWER CONSUMPTION REDUCTION WITH MULTI-LINK OPERATION IN MOBILE COMMUNICATIONS

CROSS REFERENCE TO RELATED PATENT APPLICATION(S)

The present disclosure is part of a non-provisional application claiming the priority benefit of U.S. Patent Application No. 62/797,967, filed on 29 Jan. 2019, the content of which being incorporated by reference in its entirety.

TECHNICAL FIELD

The present disclosure is generally related to mobile communications and, more particularly, to power consumption reduction with multi-link operation with respect to user equipment and network apparatus in mobile communications.

BACKGROUND

Unless otherwise indicated herein, approaches described in this section are not prior art to the claims listed below and are not admitted as prior art by inclusion in this section.

In Long-Term Evolution (LTE) or New Radio (NR), multi-link operation is introduced to increase system capacity and transmission efficiency of the communication systems. Multi-link operation can be implemented by carrier aggregation or dual connectivity, where additional links are used to increase the amount of data that can be transferred to and from a user equipment (UE). The UE can be configured with more than one radio links and can connect to more than one network nodes. However, the use of additional links comes with the cost of increased power consumption. To avoid consuming too much UE power, some power saving operations are needed to cooperate with the multi-link operation.

Several power saving mechanisms are proposed to reduce power consumption at the UE side. For example, the discontinuous reception (DRX) mechanism is one way by which the power consumption of the UE can be reduced. Alternatively, the go-to-sleep (GTS) signal is another mechanism by which the UE stops monitoring the carrier for data reception or transmission temporarily. Similarly, the wake-up signal (WUS) mechanism can be used to reduce power consumption as well. The UE may be configured to stay in the sleep mode for power saving. The reception of the WUS can trigger the UE to monitor the carrier for data reception or transmission. Another way to reduce power consumption is the use of dormant state for a cell. When the UE considers a cell to be in a dormant state, it does not monitor the cell for data exchange.

However, how to transit between the power saving operation and the multi-link operation is not clearly defined. For example, how to signal the UE to perform fast transition between the power saving operation and the multi-link operation is an important task. The indication signalling and indication format for such transition need to be well designed for UE reception and interpretation. Current signalling does not comprise any information field for indicating such transition. The UE needs explicit indication to perform and apply the transition on suitable network nodes or links. The behaviours after receiving the explicit indication should also need to be defined.

Accordingly, how to properly indicate the UE to transit between the power saving operation and the multi-link operation becomes an important aspect for the newly developed wireless communication network. Therefore, it is needed to provide proper signaling to indicate the UE and mechanisms for the UE to achieve power consumption reduction.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to power consumption reduction with multi-link operation with respect to user equipment and network apparatus in mobile communications.

In one aspect, a method may involve an apparatus establishing a first link with a first network node. The method may also involve the apparatus establishing a second link with a second network node. The method may further involve the apparatus receiving a dormancy indication via a physical layer signaling from the first network node. The method may further involve the apparatus transiting a dormancy state of the second network node according to the dormancy indication.

In one aspect, an apparatus may comprise a transceiver which, during operation, wirelessly communicates with a network node of a wireless network. The apparatus may also comprise a processor communicatively coupled to the transceiver. The processor, during operation, may perform operations comprising establishing, via the transceiver, via the transceiver, a first link with a first network node. The processor may also perform operations comprising establishing, via the transceiver, via the transceiver, a second link with a second network node. The processor may further perform operations comprising receiving, via the transceiver, a dormancy indication via a physical layer signaling from the first network node. The processor may further perform operations comprising transiting a dormancy state of the second network node according to the dormancy indication.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT) and Industrial Internet of Things (IIoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
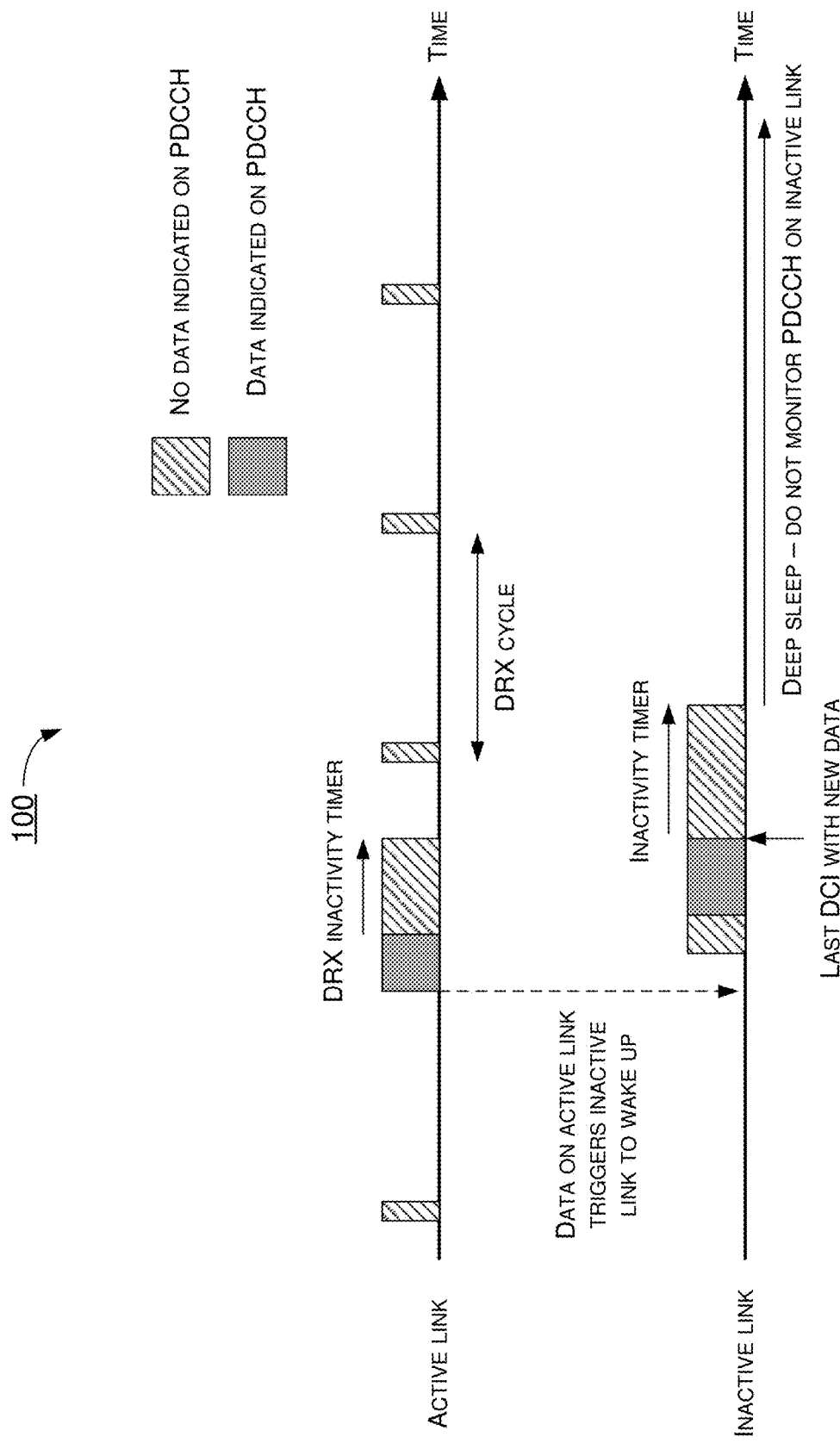
FIG. 1 is a diagram depicting an example scenario under schemes in accordance with implementations of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to power consumption reduction with multi-link operation with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In LTE or NR, multi-link operation is introduced to increase system capacity and transmission efficiency of the communication systems. Multi-link operation can be implemented by carrier aggregation or dual connectivity, where additional links are used to increase the amount of data that can be transferred to and from the UE. The UE can be configured with more than one radio links and can connect to more than one network nodes. However, the use of additional links comes with the cost of increased power consumption. To avoid consuming too much UE power, some power saving operations are needed to cooperate with the multi-link operation.

Several power saving mechanisms are proposed to reduce power consumption at the UE side. For example, the DRX mechanism is one way by which the power consumption of the UE can be reduced. The DRX mechanism reduces the number of instances over which the UE listens for transmissions from the network node, leading to power consumption reduction when traffic is sporadic. Alternatively, the GTS signal is another mechanism by which the UE stops monitoring the carrier for data reception or transmission temporarily. The UE may enter into a sleep mode for reducing power consumption after receiving the GTS signal. Similarly, the WUS mechanism can be used to reduce power consumption as well. The UE may be configured to stay in the sleep mode for power saving. The reception of the WUS can trigger the UE to monitor the carrier for data reception or transmission. Another way to reduce power consumption is the use of dormant state for a cell. When the UE considers a cell to be in a dormant state, it does not monitor the cell for data exchange. For example, the physical downlink control channel (PDDCH) is not read. The UE may continue to maintain channel state information (CSI) measurement and reporting to enable the cell to be quickly switched to an active state where the PDDCH is read.

However, how to transit between the power saving operation and the multi-link operation is not clearly defined. For example, how to signal the UE to perform fast transition between the power saving operation and the multi-link operation is an important task. The indication signalling and indication format for such transition need to be well designed for UE reception and interpretation. Current signalling does not comprise any information field for indicating such transition. The UE needs explicit indication to perform and apply the transition on suitable network nodes or links. The behaviours after receiving the explicit indication should also need to be defined.

In view of the above, the present disclosure proposes a number of schemes pertaining to power consumption reduction with multi-link operation with respect to the UE and the network apparatus. According to the schemes of the present disclosure, a physical layer signaling or layer 1 (L1) signaling is introduced for indicating the transition between the power saving operation and the multi-link operation. The physical layer signaling or L1 signaling may also comprise the information about the target network nodes for applying the transition. The UE may transit/switch an operating state of a network node or a link for power consumption reduction or multi-link operation according to the signaling. Accordingly, when multiple links are configured, the UE may be able to properly transit between the power saving operation for power reduction and the multi-link operation for data transmission.

FIG. 1 illustrates an example scenario 100 under schemes in accordance with implementations of the present disclosure. Scenario 100 involves a UE and at least one network node, which may be a part of a wireless communication network (e.g., an LTE network, an LTE-Advanced network, an LTE-Advanced Pro network, a 5G network, an NR network, an IoT network, an NB-IoT network or an IIoT network). Scenario 100 illustrates the multi-link operation proposed in the present disclosure. The UE may establish more than one radio links with one or more network nodes. For example, the UE may establish a first link with a first network node. The UE may establish at least one second link (e.g., one or multiple second links) with a second network node. The first network node may comprise a primary cell (PCell). The second network node may comprise at least one secondary cell (SCell) (e.g., one or multiple SCells). When downlink or uplink activity is present, the UE may transit/switch from the single link operation to the multi-link operation. The UE may perform data exchange on both the first link and the second link (e.g., multi-link operation). When the UE enters into a power saving mode or a sleep mode, the UE may transmit/switch from the multi-link operation to the single link operation. In some implementations, the UE may establish multiple links with the same network node. In such implementations, the first network node and the second network node may be the same network node.

The UE may be configured to receive a dormancy indication via a physical layer signaling or L1 signaling from the first network node. The UE may be configured to transit a dormancy state of the second network node according to the dormancy indication. The physical layer signaling or L1 signaling may comprise a WUS or a downlink control information (DCI) format. The UE may transit from a dormancy-like state to a non-dormancy-like state or from a non-dormancy-like state to a dormancy-like state for the second network node according to the dormancy indication. The dormancy indication may comprise a bitmap indicating a group of network nodes per bit. Each group may comprise at least one network node (e.g., one or more network nodes). After transiting from the dormancy-like state to the non-dormancy-like state, the UE may be configured to monitor the PDCCH on the second network node. The UE may be configured to switch from a dormant BWP to a specific BWP on the second network node. The UE may be configured to perform the multi-link operation after transiting from the dormancy-like state to the non-dormancy-like state. In contrary, after transiting from the non-dormancy-like state to the dormancy-like state, the UE may be configured not to monitor the PDCCH on the second network node. The UE may be configured to switch from a specific BWP to a dormant BWP on the second network node. The UE may be configured to perform the single link operation after transiting from the non-dormancy-like state to the dormancy-like state.

When the data exchange becomes or is expected to be infrequent, the UE may be configured to transit from the multi-link operation to the power saving operation (e.g., single link operation). For example, when the UE uses the DRX mechanism, it may expect that the data exchange is infrequent. Alternatively, when a GTS indication is received, the UE may expect that the data exchange is infrequent. When the UE enter into a sleep mode or power saving mode, the UE may be configured to transit/switch from the multi-link operation to the single link operation.

The conditions for triggering the transition/switch to the single link operation may comprise, for example and without limitation, the expiry of a DRX inactivity timer, the expiry of a DRX short cycle timer, or the reception of a GTS indication. After transiting to the single link operation, the UE may be configured to monitor only the first network node. The monitored network node may comprise, for example and without limitation, a PCell, a Primary Secondary Cell (PSCell), a PCell of a master cell group (MCG), or a lead cell configured by the network. The lead cell may be defined per media access control (MAC) entity or per UE.

On the other hand, after transiting to the single link operation, some behaviours of the links (e.g., the second link) apart from the monitored link (e.g., the first link) may be defined. For example, the UE may consider the second network node to be in a deactivated state. The UE may consider the second network node to be in a dormant state. The UE may monitor WUS on the second network node. The UE may switch the bandwidth part (BWP) on the second network node to a power saving BWP. The UE may perform background activities such as channel state information-reference signal (CSI-RS) acquisition, CSI reporting, radio link monitoring (RLM) or radio resource management (RRM) on the second network node. These background activities (BA) may be performed in a configured BA window. The BA configuration may be configured per link or common to part or all the links.

When the data exchange is expected or scheduled, the UE may be configured to transit from the power saving operation (e.g., single link operation) to the multi-link operation. The conditions for triggering the transition/switch to the multi-link operation may comprise, for example and without limitation, when a WUS is received by the UE on the monitored network node, when a WUS is received by the UE on a link which is activated, when a downlink control information (DCI) is received on the monitored network node, when a scheduling request (SR) is transmitted, when the BWP of the monitored network node switches from the power saving BWP, when a timer associated with the GTS indication expires, or when WUS or DCI monitored in the monitored network node contains an indication to activate one or several links. The indication may be indicated separately for each network node. The indication may be encoded such that each possible value corresponds to a group of network nodes.

When the UE transits/switches from the single operation to the multi-link operation, the links or network nodes to be activated may comprise, for example and without limitation, all configured SCells in the UE or in the MAC entity, the network nodes indicated in the WUS, the network nodes indicated in the DCI, a configured sub-set of network nodes, or the PCell of the MCG and the PSCell of the Secondary Cell group (SCG).

On the other hand, after transiting to the multi-link operation, some behaviours of the links or network nodes to be activated may be defined. For example, the UE may consider these network nodes to switch from a deactivated state to an active state. The UE may consider these network nodes to switch from a dormant state to an active state. The UE may monitor the PDCCH on the activated link or network nodes. The UE may switch the BWP on the activated network nodes to a specified BWP.

In some implementations, in the power saving operation, the UE may be outside active time. For example, the UE may not need to monitor PDCCH until receiving the WUS while operate outside active time. When the UE is outside active time, for the L1 or physical layer based mechanism for transiting from the dormancy-like state to the non-dormancy-like state on the activated network node (e.g., SCell), an explicit information field for the UE may be introduced to the PDCCH WUS. The explicit information field may be configurable within a range of 0 to X1 bits. The value of X1 may be, for example and without limitation, greater than 0 and smaller than 15. Alternatively, the explicit information field in DCI may comprise a bitmap with up to X1 bits and 1 bit per group of configured network nodes (e.g., SCells). Each network node group may comprise one or multiple network nodes up to X1 network node groups configured via a radio resource control (RRC) signaling.

In some implementations, when the UE is in the active time, for the L1 or physical layer based mechanism for transiting between the dormancy-like state and the non-dormancy-like state on the activated network node (e.g., SCell), an explicit information field may be introduced to at least DCI format 0_1 and 1_1 for the first network node (e.g., PCell). The explicit information field may be configurable within a range of 0 to X2 bits. The value of X2 may be, for example and without limitation, greater than 0 and smaller than 15. For the L1 or physical layer based second network node (e.g., SCell) dormancy indication sent on the first network node (e.g., PCell) within active time, the UE may be configured with at least two BWPs for the second network node. The explicit information field in DCI may indicate switching to/from the dormant BWP configured for the second network node. The PDCCH may be used to schedule data for the first network node and also indicate dormancy for the second network node. N second network node groups (e.g., SCell groups) may be configured for the UE where each second network node group may comprise one or multiple second network nodes. The explicit information field for the second network node dormancy indication may be a bitmap of length N with each bit corresponding to one second network node group. The bitmap may be appended to existing fields of DCI format 0_0 or 0_1.

Illustrative Implementations

Figure 2:
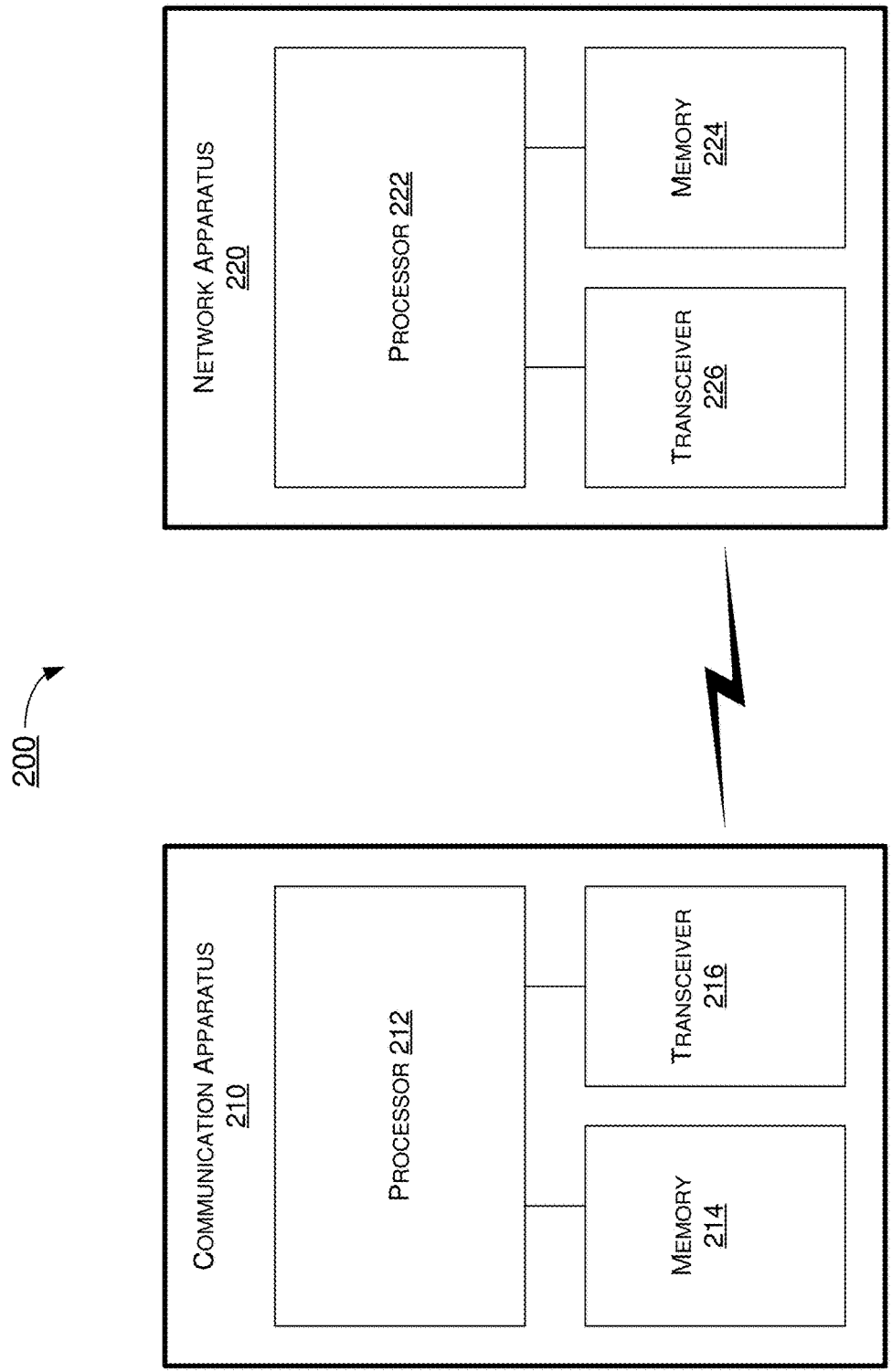
FIG. 2 is a block diagram of an example communication apparatus and an example network apparatus in accordance with an implementation of the present disclosure.

FIG. 2 illustrates an example communication apparatus 210 and an example network apparatus 220 in accordance with an implementation of the present disclosure. Each of communication apparatus 210 and network apparatus 220 may perform various functions to implement schemes, techniques, processes and methods described herein pertaining to power consumption reduction with multi-link operation with respect to user equipment and network apparatus in wireless communications, including scenarios/mechanisms described above as well as process 300 described below.

Communication apparatus 210 may be a part of an electronic apparatus, which may be a UE such as a portable or mobile apparatus, a wearable apparatus, a wireless communication apparatus or a computing apparatus. For instance, communication apparatus 210 may be implemented in a smartphone, a smartwatch, a personal digital assistant, a digital camera, or a computing equipment such as a tablet computer, a laptop computer or a notebook computer. Communication apparatus 210 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 210 may be implemented in a smart thermostat, a smart fridge, a smart door lock, a wireless speaker or a home control center. Alternatively, communication apparatus 210 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 210 may include at least some of those components shown in FIG. 2 such as a processor 212, for example. communication apparatus 210 may further include one or more other components not pertinent to the proposed scheme of the present disclosure (e.g., internal power supply, display device and/or user interface device), and, thus, such component(s) of communication apparatus 210 are neither shown in FIG. 2 nor described below in the interest of simplicity and brevity.

Network apparatus 220 may be a part of an electronic apparatus, which may be a network node such as a base station, a small cell, a router or a gateway. For instance, network apparatus 220 may be implemented in an eNodeB in an LTE, LTE-Advanced or LTE-Advanced Pro network or in a gNB in a 5G, NR, IoT, NB-IoT or IIoT network. Alternatively, network apparatus 220 may be implemented in the form of one or more IC chips such as, for example and without limitation, one or more single-core processors, one or more multi-core processors, or one or more RISC or CISC processors. Network apparatus 220 may include at least some of those components shown in FIG. 2 such as a processor 222, for example. Network apparatus 220 may further include one or more other components not pertinent to the proposed scheme of the present disclosure (e.g., internal power supply, display device and/or user interface device), and, thus, such component(s) of network apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including power consumption reduction in a device (e.g., as represented by communication apparatus 210) and a network (e.g., as represented by network apparatus 220) in accordance with various implementations of the present disclosure.

In some implementations, communication apparatus 210 may also include a transceiver 216 coupled to processor 212 and capable of wirelessly transmitting and receiving data. In some implementations, communication apparatus 210 may further include a memory 214 coupled to processor 212 and capable of being accessed by processor 212 and storing data therein. In some implementations, network apparatus 220 may also include a transceiver 226 coupled to processor 222 and capable of wirelessly transmitting and receiving data. In some implementations, network apparatus 220 may further include a memory 224 coupled to processor 222 and capable of being accessed by processor 222 and storing data therein. Accordingly, communication apparatus 210 and network apparatus 220 may wirelessly communicate with each other via transceiver 216 and transceiver 226, respectively. To aid better understanding, the following description of the operations, functionalities and capabilities of each of communication apparatus 210 and network apparatus 220 is provided in the context of a mobile communication environment in which communication apparatus 210 is implemented in or as a communication apparatus or a UE and network apparatus 220 is implemented in or as a network node of a communication network.

In some implementations, processor 212 may establish more than one radio links with one or more network apparatus implemented as network apparatus 220. For example, processor 212 may establish, via transceiver 216, a first link with a first network apparatus. The UE may establish, via transceiver 216, a second link with a second network apparatus. The first network apparatus may comprise a PCell. The second network node may comprise at least one SCell. When downlink or uplink activity is present, processor 212 may transit/switch from the single link operation to the multi-link operation. Processor 212 may perform, via transceiver 216, data exchange on both the first link and the second link (e.g., multi-link operation). When processor 212 enters into a power saving mode or a sleep mode, processor 212 may transmit/switch from the multi-link operation to the single link operation. In some implementations, processor 212 may establish, via transceiver 216, multiple links with the same network apparatus. In such implementations, the first network apparatus and the second network apparatus may be the same network apparatus.

In some implementations, processor 212 may be configured to receive, via transceiver 216, a dormancy indication via a physical layer signaling or L1 signaling from the first network apparatus. Processor 212 may be configured to transit a dormancy state of the second network apparatus according to the dormancy indication. Processor 212 may transit from a dormancy-like state to a non-dormancy-like state or from a non-dormancy-like state to a dormancy-like state for the second network apparatus according to the dormancy indication.

In some implementations, after transiting from the dormancy-like state to the non-dormancy-like state, processor 212 may be configured to monitor the PDCCH on the second network apparatus. Processor 212 may be configured to switch from a dormant BWP to a specific BWP on the second network apparatus. Processor 212 may be configured to perform, via transceiver 216, the multi-link operation after transiting from the dormancy-like state to the non-dormancy-like state.

In some implementations, after transiting from the non-dormancy-like state to the dormancy-like state, processor 212 may be configured not to monitor the PDCCH on the second network apparatus. Processor 212 may be configured to switch from a specific BWP to a dormant BWP on the second network apparatus. Processor 212 may be configured to perform, via transceiver 216, the single link operation after transiting from the non-dormancy-like state to the dormancy-like state.

In some implementations, when the data exchange becomes or is expected to be infrequent, processor 212 may be configured to transit from the multi-link operation to the power saving operation (e.g., single link operation). For example, when processor 212 uses the DRX mechanism, it may expect that the data exchange is infrequent. Alternatively, when a GTS indication is received, processor 212 may expect that the data exchange is infrequent. When processor 212 enter into a sleep mode or power saving mode, processor 212 may be configured to transit/switch from the multi-link operation to the single link operation.

In some implementations, processor 212 may be triggered to transit/switch to the single link operation when some conditions are met. The conditions may comprise, for example and without limitation, the expiry of a DRX inactivity timer, the expiry of a DRX short cycle timer, or the reception of a GTS indication. After transiting to the single link operation, processor 212 may be configured to monitor only the first network apparatus. The monitored network apparatus may comprise, for example and without limitation, a PCell, a PSCell, a PCell of a MCG, or a lead cell configured by the network. The lead cell may be defined per MAC entity or per communication apparatus.

In some implementations, after transiting to the single link operation, some behaviours of the links (e.g., the second link) apart from the monitored link (e.g., the first link) may be performed. For example, processor 212 may consider the second network apparatus to be in a deactivated state. Processor 212 may consider the second network apparatus to be in a dormant state. Processor 212 may monitor WUS on the second network apparatus. Processor 212 may switch the BWP on the second network apparatus to a power saving BWP. Processor 212 may perform background activities such as CSI-RS acquisition, CSI reporting, RLM or RRM on the second network apparatus. Processor 212 may perform these BA in a configured BA window. Processor 212 may apply the BA configuration per link or on part or all the links.

In some implementations, when the data exchange is expected or scheduled, processor 212 may be configured to transit from the power saving operation (e.g., single link operation) to the multi-link operation. Processor 212 may be triggered to transit/switch to the multi-link operation when some conditions are met. The conditions may comprise, for example and without limitation, when a WUS is received by processor 212 on the monitored network apparatus, when a WUS is received by processor 212 on a link which is activated, when a DCI is received on the monitored network apparatus, when an SR is transmitted by processor 212, when the BWP of the monitored network apparatus switches from the power saving BWP, when a timer associated with the GTS indication expires, or when WUS or DCI monitored in the monitored network apparatus contains an indication to activate one or several links.

In some implementations, when processor 212 transits/switches from the single operation to the multi-link operation, processor 212 may activate the links or network apparatus comprising, for example and without limitation, all configured SCells in processor 212 or in the MAC entity, the network apparatus indicated in the WUS, the network apparatus indicated in the DCI, a configured sub-set of network apparatus, or the PCell of the MCG and the PSCell of the SCG.

In some implementations, after transiting to the multi-link operation, some behaviours of the links or network apparatus to be activated may be performed. For example, processor 212 may consider these network apparatuses to switch from a deactivated state to an active state. Processor 212 may consider these network apparatuses to switch from a dormant state to an active state. Processor 212 may monitor the PDCCH on the activated link or network apparatus. Processor 212 may switch the BWP on the activated network apparatus to a specified BWP.

In some implementations, in the power saving operation, processor 212 may be outside active time. For example, processor 212 may not need to monitor PDCCH until receiving the WUS while operate outside active time. When processor 212 is outside active time, for the L1 or physical layer based mechanism for transiting from the dormancy-like state to the non-dormancy-like state on the activated network apparatus (e.g., SCell), an explicit information field in the PDCCH WUS may be received by processor 212.

In some implementations, when processor 212 is in the active time, for the L1 or physical layer based mechanism for transiting between the dormancy-like state and the non-dormancy-like state on the activated network node (e.g., SCell), an explicit information field in DCI format 0_1 or 1_1 from the first network apparatus (e.g., PCell) may be received by processor 212.

Illustrative Processes

Figure 3:
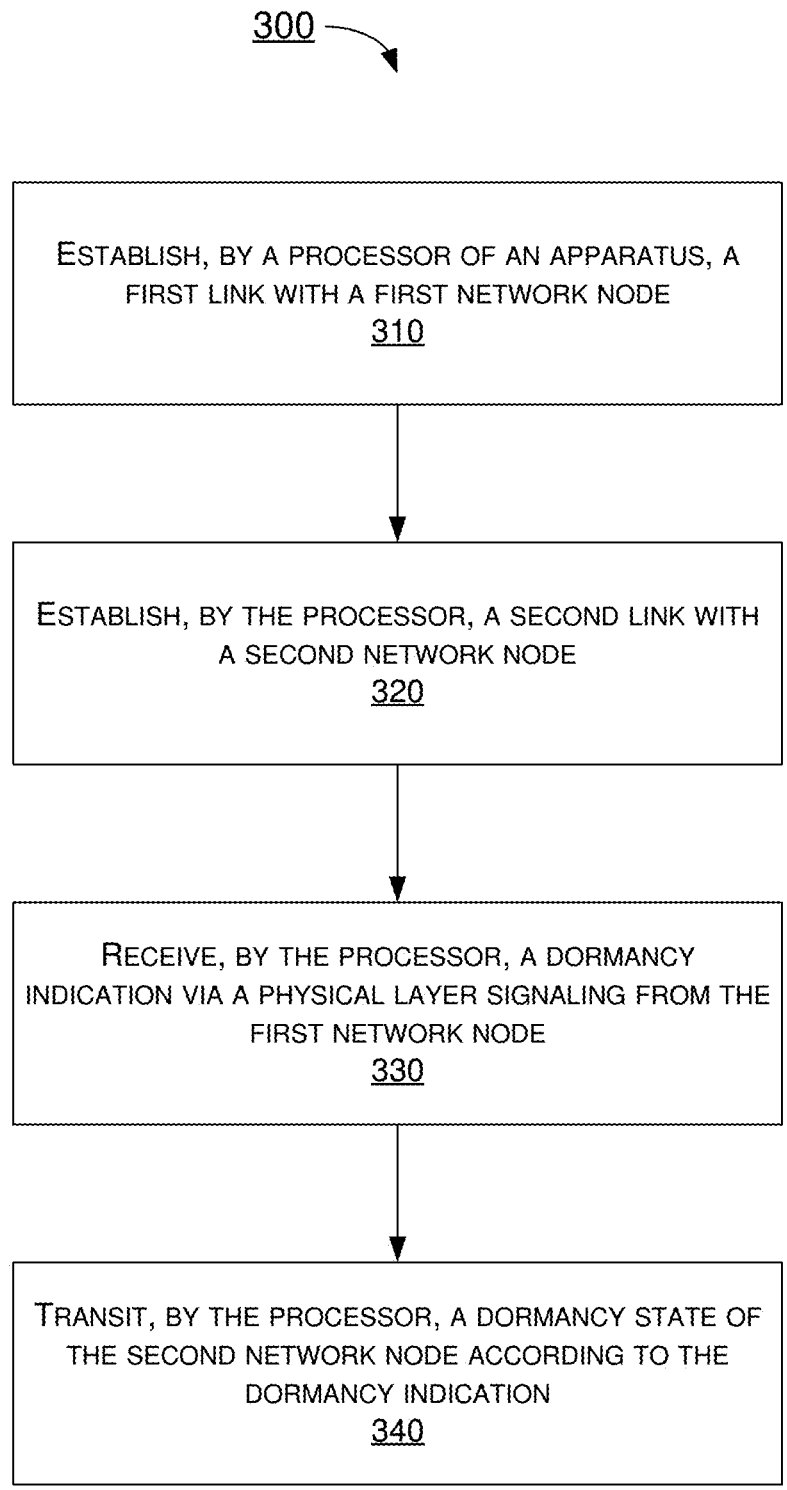
FIG. 3 is a flowchart of an example process in accordance with an implementation of the present disclosure.

FIG. 3 illustrates an example process 300 in accordance with an implementation of the present disclosure. Process 300 may be an example implementation of above scenarios/schemes, whether partially or completely, with respect to power consumption reduction with multi-link operation with the present disclosure. Process 300 may represent an aspect of implementation of features of communication apparatus 210. Process 300 may include one or more operations, actions, or functions as illustrated by one or more of blocks 310, 320, 330 and 340. Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may be implemented by communication apparatus 210 or any suitable UE or machine type devices. Solely for illustrative purposes and without limitation, process 300 is described below in the context of communication apparatus 210. Process 300 may begin at block 310.

At 310, process 300 may involve processor 212 of apparatus 210 establishing a first link with a first network node. Process 300 may proceed from 310 to 320.

At 320, process 300 may involve processor 212 establishing a second link with a second network node. Process 300 may proceed from 320 to 330.

At 330, process 300 may involve processor 212 receiving a dormancy indication via a physical layer signaling from the first network node. Process 300 may proceed from 330 to 340.

At 340, process 300 may involve processor 212 transiting a dormancy state of the second network node according to the dormancy indication.

In some implementations, the physical layer signaling may comprise a WUS or a DCI format.

In some implementations, process 300 may involve processor 212 transiting from a dormancy-like state to a non-dormancy-like state or from the non-dormancy-like state to the dormancy-like state.

In some implementations, the dormancy indication may comprise a bitmap indicating a group of network nodes per bit. The group of network nodes may comprise at least one network node.

In some implementations, the first network node may comprise a PCell. The second network node may comprise at least one SCell.

In some implementations, process 300 may involve processor 212 monitoring a PDCCH on the second network node after transiting from the dormancy-like state to the non-dormancy-like state.

In some implementations, process 300 may involve processor 212 switching from a dormant BWP on the second network node after transiting from the dormancy-like state to the non-dormancy-like state.

In some implementations, process 300 may involve processor 212 switching to a dormant BWP on the second network node after transiting from the non-dormancy-like state to the dormancy-like state.

In some implementations, process 300 may involve processor 212 performing a multi-link operation after transiting from the dormancy-like state to the non-dormancy-like state.

In some implementations, process 300 may involve processor 212 performing a single link operation after transiting from the non-dormancy-like state to the dormancy-like state.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   establishing, by a processor of an apparatus, a first link with a first network node;
   establishing, by the processor, a number of links with a multitude of secondary network nodes;
   receiving, by the processor, a dormancy indication via a physical layer signaling from the first network node; and
   transiting, by the processor, a dormancy state of a group of network nodes among one or more groups of network nodes of the multitude of secondary network nodes according to the dormancy indication,
   wherein the transiting of the dormancy state of the group of network nodes comprises stopping to monitor the group of network nodes regarding data exchange in response to the group of network nodes entering a dormancy-like state,
   wherein the dormancy indication comprises a bitmap indicating a respective group of network nodes of the multitude of secondary network nodes per bit, and
   wherein the group of network nodes comprises at least one network node.

2. The method of claim 1, wherein the physical layer signaling comprises a wake-up signal (WUS) or a downlink control information (DCI) format.

3. The method of claim 1, wherein the transiting comprises transiting from the dormancy-like state to a non-dormancy-like state or from the non-dormancy-like state to the dormancy-like state.

4. The method of claim 1, wherein the first network node comprises a primary cell (PCell), and wherein the secondary network nodes comprises at least one secondary cell (SCell).

5. The method of claim 3, further comprising:
   monitoring, by the processor, a physical downlink control channel (PDCCH) on the group of network nodes after transiting from the dormancy-like state to the non-dormancy-like state.

6. The method of claim 3, further comprising:
   switching, by the processor, from a dormant bandwidth part (BWP) on the group of network nodes after transiting from the dormancy-like state to the non-dormancy-like state.

7. The method of claim 3, further comprising:
   switching, by the processor, to a dormant bandwidth part (BWP) on the group of network nodes after transiting from the non-dormancy-like state to the dormancy-like state.

8. The method of claim 3, further comprising:
   performing, by the processor, a multi-link operation after transiting from the dormancy-like state to the non-dormancy-like state.

9. The method of claim 3, further comprising:
   performing, by the processor, a single link operation after transiting from the non-dormancy-like state to the dormancy-like state.

10. An apparatus, comprising:
    a transceiver which, during operation, wirelessly communicates with network nodes of a wireless network; and
    a processor communicatively coupled to the transceiver such that, during operation, the processor performs operations comprising:
    establishing, via the transceiver a first link with a first network node;
    establishing, via the transceiver a number of links with a multitude of secondary network nodes;
    receiving, via the transceiver, a dormancy indication via a physical layer signaling from the first network node; and
    transiting a dormancy state of a group of network nodes among one or more groups of network nodes of the multitude of secondary network nodes according to the dormancy indication,
    wherein, in transiting the dormancy state of the group of network nodes, the processor stops to monitor the group of network nodes regarding data exchange in response to the group of network nodes entering a dormancy-like state,
    wherein the dormancy indication comprises a bitmap indicating a respective group of network nodes of the multitude of secondary network nodes per bit, and
    wherein the group of network nodes comprises at least one network node.

11. The apparatus of claim 10, wherein the physical layer signaling comprises a wake-up signal (WUS) or a downlink control information (DCI) format.

12. The apparatus of claim 10, wherein, in transiting the dormancy state of the group of network nodes, the processor transits from the dormancy-like state to a non-dormancy-like state or from the non-dormancy-like state to the dormancy-like state.

13. The apparatus of claim 10, wherein the first network node comprises a primary cell (PCell), and wherein the secondary network nodes comprises at least one secondary cell (SCell).

14. The apparatus of claim 12, wherein, during operation, the processor further performs operations comprising:
    monitoring, via the transceiver, a physical downlink control channel (PDCCH) on the group of network nodes after transiting from the dormancy-like state to the non-dormancy-like state.

15. The apparatus of claim 12, wherein, during operation, the processor further performs operations comprising:
    switching from a dormant bandwidth part (BWP) on the group of network nodes after transiting from the dormancy-like state to the non-dormancy-like state.

16. The apparatus of claim 12, wherein, during operation, the processor further performs operations comprising:
    switching to a dormant bandwidth part (BWP) on the group of network nodes after transiting from the non-dormancy-like state to the dormancy-like state.

17. The apparatus of claim 12, wherein, during operation, the processor further performs operations comprising:
    performing a multi-link operation after transiting from the dormancy-like state to the non-dormancy-like state.

18. The apparatus of claim 12, wherein, during operation, the processor further performs operations comprising:
    performing a single link operation after transiting from the non-dormancy-like state to the dormancy-like state.

* * * * *